United States Patent
Andersen

(10) Patent No.: US 8,068,926 B2
(45) Date of Patent: Nov. 29, 2011

(54) METHOD FOR GENERATING CONCEALMENT FRAMES IN COMMUNICATION SYSTEM

(75) Inventor: Søren Andersen, Aalborg (DK)

(73) Assignee: Skype Limited, Dublin (IE)

( * ) Notice: Subject to any disclaimer, the term of this patent is extended or adjusted under 35 U.S.C. 154(b) by 904 days.

(21) Appl. No.: 11/883,427

(22) PCT Filed: Jan. 31, 2006

(86) PCT No.: PCT/DK2006/000053
§ 371 (c)(1),
(2), (4) Date: Mar. 7, 2008

(87) PCT Pub. No.: WO2006/079348
PCT Pub. Date: Aug. 3, 2006

(65) Prior Publication Data
US 2010/0161086 A1    Jun. 24, 2010

(30) Foreign Application Priority Data
Jan. 31, 2005    (DK) .................................. 2005 00146

(51) Int. Cl.
*G06F 17/00*    (2006.01)
(52) U.S. Cl. ........................................ 700/94
(58) Field of Classification Search .................. 700/94; 704/262, 223, 228, 500–504
See application file for complete search history.

(56) References Cited

U.S. PATENT DOCUMENTS

| | | | |
|---|---|---|---|
| 5,371,853 A | 12/1994 | Kao et al. | |
| 5,581,652 A | 12/1996 | Abe et al. | |
| 5,602,959 A | 2/1997 | Bergstrom et al. | |
| 5,699,481 A | 12/1997 | Shlomot et al. | |
| 5,757,858 A | 5/1998 | Black et al. | |
| 5,806,037 A | 9/1998 | Sogo | |
| 5,909,663 A | 6/1999 | Iijima et al. | |
| 6,028,890 A | 2/2000 | Salami et al. | |
| 6,311,153 B1 | 10/2001 | Nakatoh et al. | |
| 6,415,253 B1 | 7/2002 | Johnson | |
| 6,487,535 B1 | 11/2002 | Smyth et al. | |
| 6,661,842 B1 | 12/2003 | Abousleman | |
| 6,691,082 B1 | 2/2004 | Aguilar et al. | |
| 7,117,156 B1 | 10/2006 | Kapilow | |

(Continued)

FOREIGN PATENT DOCUMENTS

EP    1 278 353    1/2003

(Continued)

OTHER PUBLICATIONS

Decision on Grant, Patent for Invention dated Oct. 11, 2010 issued in corresponding Russian Application No. 2007132735/09 and English translation thereof.

(Continued)

*Primary Examiner* — Andrew C Flanders
(74) *Attorney, Agent, or Firm* — Hamilton, Brook, Smith & Reynolds, P.C.

(57) ABSTRACT

A method for generating a sequence of concealment samples in connection with transmission of a digitized audio signal, wherein the method comprises generating the sequence of concealment samples from buffered samples of the digitized representation of audio signal in sample time order, wherein at least two consecutive subsequences of samples in the sequence of concealment samples are based on subsequences of buffered samples, wherein said subsequences of buffered samples are consecutive in reordered time.

37 Claims, 8 Drawing Sheets

U.S. PATENT DOCUMENTS

| | | | |
|---|---|---|---|
| 7,590,525 B2* | 9/2009 | Chen | 704/211 |
| 7,711,563 B2* | 5/2010 | Chen | 704/262 |
| 7,895,046 B2 | 2/2011 | Andersen et al. | |
| 2002/0133764 A1 | 9/2002 | Wang | |
| 2002/0143526 A1 | 10/2002 | Coorman et al. | |
| 2002/0173949 A1 | 11/2002 | Gigi | |
| 2003/0078769 A1 | 4/2003 | Chen | |
| 2003/0167170 A1 | 9/2003 | Andersen et al. | |
| 2003/0202528 A1 | 10/2003 | Eckberg | |
| 2004/0122662 A1 | 6/2004 | Crockett | |
| 2004/0136448 A1 | 7/2004 | Miller | |
| 2005/0007952 A1 | 1/2005 | Scott | |
| 2005/0031097 A1 | 2/2005 | Rabenko et al. | |
| 2006/0149532 A1 | 7/2006 | Boillot et al. | |
| 2006/0153286 A1 | 7/2006 | Andersen et al. | |
| 2008/0154584 A1 | 6/2008 | Andersen | |
| 2008/0275580 A1 | 11/2008 | Andersen | |

FOREIGN PATENT DOCUMENTS

| | | |
|---|---|---|
| EP | 1 288 916 A | 3/2003 |
| WO | WO 94/29850 | 12/1994 |
| WO | WO 00/63881 A | 10/2000 |
| WO | WO 01/48736 | 7/2001 |
| WO | WO 03/102921 | 11/2003 |

OTHER PUBLICATIONS

English abstract of RU 2000102555.

International Search Report: PCT/DK2006/000053 PCT/ISA/210, Apr. 2005.

International Preliminary Report on Patentability PCT/IPEA/409, Apr. 2005.

PCT International Preliminary Examination Authority Report PCT/IPEA/416, Jan. 2004.

Written Opinion of the International Searching Authority PCT/ISA/237, Apr. 2005.

David Goodman et al., "Waveform Substitution Techniques for Recovering Missing Speech Segments in Packet Voice Communications", IEEE Transactions on Acoustics, Speech and Signal Processing, vol. ASSP-34 No. 6, Dec. 1986.

Maha Elsabrouty et al., "Receiver-Based Packet Loss Concealment for Pulse Code Modulation (PCM G.711) Coder", in Signal Processing 84, 663-667, Sep. 2002.

ITU-T Recommendation G.711—Appendix 1 "A high quality low-complexity algorithm for packet loss concealment with G.711" (Sep. 1999).

ITU-T Recommendation G.729—"Coding of speech at 8 kbit/s using conjugate-structure algebraic-code-excited linear prediction (CS-ACELP)" (Mar. 1996).

Yi J. Liang et al., "Adaptive Playout Scheduling and Loss Concealment for Voice Communication over IP Networks", *IEEE Trans. On Multimedia*, vol. 5, No. 4, pp. 532-543 (Dec. 2003).

S. Andersen, et al., Internet Engineering Task Force Request for Comments 3951, *The Internet Society* (Dec. 2004).

Christoffer Asgaard Rodbro et al., "Time Scaling of Sinusoids for Intelligent Jitter Buffer in Packet Based Telephony", *IEEE Proc. Workshop on Speech Coding*, pp. 71-73 (2002).

R.A. Valenzuela et al., "A New Voice-Packet Reconstruction Technique", *IEEE*, pp. 1334-1336 (1989).

Robert Brennan et al., "An Ultra Low-Power DSP System with a Flexible Filterbank", *IEEE*, Conf. Record of 35th Asilomar Conf. on Signals, Systems & Computers, Pacific Grove, CA, Nov. 4-7, 2001. vol. 1 of 2, pp. 809-813.

Office Action mailed Mar. 30, 2011 in co-pending U.S. Appl. No. 11/883,430.

Office Action mailed Apr. 18, 2011 in co-pending U.S. Appl. No. 11/883,440.

* cited by examiner

METHOD FOR GENERATING CONCEALMENT FRAMES IN COMMUNICATION SYSTEM

FIELD OF THE INVENTION

The present invention relates to telecommunication systems. More particularly, the present invention relates to a method, a device, and an arrangement that compensates for loss and/or delay jitter and/or clock skew of signal packets in order to improve the quality of signal transmission over wireless telecommunication systems and packet switched networks.

BACKGROUND OF THE INVENTION

Modern telecommunications are based on digital transmission of signals. For example, in FIG. 1, a transmitter 200 collects a sound signal from a source 100. This source can be the result of one or more persons speech and other acoustic wave sources collected by a microphone, or it can be a sound signal storage or generation system such as a text-to-speech synthesis or dialog system. If the source signal is analog it is converted to a digital representation by means of an analog-to-digital converter. The digital representation is subsequently encoded and placed in packets following a format suitable for the digital channel 300. The packets are transmitted over the digital channel. The digital channel typically comprises multiple layers of abstraction.

At the layer of abstraction in FIG. 1, the digital channel takes a sequence of packets as input and delivers a sequence of packets as output. Due to degradations in the channel, typically caused in noise, imperfections, and overload in the channel, the output packet sequence is typically contaminated with loss of some of the packets and arrival time delay and delay jitter for other packets. Furthermore, difference in clock of the transmitter and the receiver can result in clock skew. It is the task of the receiver 400 to decode the received data packets and to convert the decoded digital representations from the packet stream and decode this into digital signal representations and further convert these representations into a decoded sound signal in a format suitable for output to the signal sink 500. This signal sink can be one or more persons who are presented the decoded sound signal by means of, e.g., one or more loudspeakers. Alternatively, the signal sink can be a speech or audio storage system or a speech or audio dialog system or recognizer.

It is the task of the receiver to accurately reproduce a signal that can be presented to the sink. When the sink directly or indirectly comprises human listeners, an object of the receiver is to obtain a representation of the sound signal that, when presented to the human listeners, accurately reproduces the humanly perceived impression and information of the acoustic signal from the source or sources. To secure this task in the common case where the channel degrades the received sequence of packets with loss, delay, delay jitter, and clock skew may furthermore be present, an efficient concealment is necessary as part of the receiver subsystem.

As an example, one possible implementation of a receiver subsystem to accomplish this task is illustrated in FIG. 2. As indicated in this figure, incoming packets are stored in a jitter buffer 410 from where a decoding and concealment unit 420 acquires received encoded signal representations, and decodes and conceals these encoded signal representations to obtain signal representations suitable for storage in a playout buffer 430 and subsequent playout. The control of when to initiate concealment and what specific parameters of this concealment, such as length of the concealed signal, can, as an example, be carried out by a control unit 440, which monitors the contents of the jitter buffer and the playout buffer and controls the action of the decoding and concealment unit 420.

Concealment can also be accomplished as part of a channel subsystem. FIG. 3 illustrates one example of a channel subsystem in which packets are forwarded from a channel 310 to a channel 330 via a subsystem 320, which we for later reference term the relay. In practical systems the relay function may be accomplished by units, which may take a variety of context dependent names, such as diverse types of routers, proxy servers, edge servers, network access controllers, wireless local area network controllers, Voice-over-IP gateways, media gateways, unlicensed network controllers, and other names. In the present context all these as examples of relay systems.

One example of a relay system that is able to do audio concealment is illustrated in FIG. 4. As illustrated in this figure, packets are forwarded from an input buffer 310 to an output buffer 360 via packet switching subsystems 320 and 350. The control unit 370 monitors the input and output buffers, and as a result of this monitoring, makes decisions if transcoding and concealment is necessary. If this is the case, the switches direct the packets via the transcoding and concealment unit 330. If this is not the case, the switches directs the packets via the minimal protocol action subsystem 340, which will make a minimum of operations on the packet headers to remain compliant with applied protocols. This can comprise steps of altering sequence number and time-stamp of the packets.

In transmission of audio signals using systems exemplified by, but not limited to, the above descriptions, there is the need for concealment of loss, delay, delay jitter, and/or clock skew in signals representative, or partially representative, of the sound signal. Prior art techniques to approach this concealment task categorize in pitch repetition methods and time-scale modification methods.

Pitch repetition methods, sometimes embodied in the oscillator model, are based in an estimate of the pitch period in voiced speech, or alternatively in the estimation of the corresponding fundamental frequency of the voiced speech signal. Given the pitch period, a concealment frame is obtained by repeated readout of the last pitch period. Discontinuities at the beginning and end of the concealment frame and between each repetition of the pitch period can be smoothed using a windowed overlap-add procedure. See patent number WO 0148736 and International Telecommunications Union recommendation ITU-T G.711 Appendix 1 for examples of the pitch repetition method.

Prior art systems integrate pitch repetition based concealment with decoders based in the linear predictive coding principle. In these systems the pitch repetition is typically accomplished in the linear predictive excitation domain by a read out from the long-term predictor or adaptive codebook loop. See U.S. Pat. No. 5,699,481, International Telecommunications Union recommendation ITU-T G.729, and Internet Engineering Task Force Request For Comments 3951 for examples of pitch repetition based concealment in the linear predictive excitation domain. The above methods apply for concealing a loss or an increasing delay, i.e., a positive delay jitter, and situations of input or jitter buffer underflow or near underflow e.g. due to clock skew. To conceal a decreasing delay, a negative delay jitter, or an input or jitter buffer overflow or near overflow, the generation of a shortened concealment signal is needed. Pitch based methods accomplish this by an overlap add procedure between a pitch period and an earlier pitch period. See patent number WO 0148736 for an example of this method.

Again this can be accomplished while exploiting facilities present in linear predictive decoders. As an example, U.S. Pat. No. 5,699,481 discloses a method by which fixed codebook contribution vectors are simply discarded from the reproduction signal, relying on the state of the adaptive codebook to secure pitch periodicity in the reproduced signal. In connection with pitch repetition methods one object is a seamless signal continuation from the concealment frame to the next frame. Patent no. WO 0148736 discloses a method to achieve this object. By the invention disclosed in WO 0148736 this object is achieved by means of concealment frames of time varying and possibly signal dependent length. Whereas this efficiently can secure seamless signal continuation in connection with concealment of delay jitter and clock skew, this solution introduce a deficiency in connection with systems of the type depicted in FIG. 4: Following this type of concealment an encoding of the concealment into frames of fixed preset length that connects seamlessly with the already encoded frames that are preferably relayed via the minimal protocol action 340, cannot be guaranteed.

A recurrent problem in pitch repetition based methods for concealment of loss and abruptly increasing delay is that the repetition of pitch cycles makes the reproduced signal sound unnatural. More specifically, this audio signal becomes too periodic. In worst cases so-called string sounds are perceived in the reproduced sound signal. To alleviate this problem, numerous methods exist in the prior art. These methods include the use of repetition periods that are the double or triple of the estimated pitch period. As one example, Internet Engineering Task Force Request For Comments 3951 describes a method by which two times the estimated pitch period will be used if the estimated pitch period is less than 10 ms. As another example, International Telecommunications Union recommendation ITU-T G.711 Appendix 1 describes a method by which a doubling and later a tripling of the repetition period is introduced to repeat two and later three pitch cycles rather than repeating a single pitch period. See International Telecommunications Union recommendation ITU-T G.711 Appendix 1 for a full description of this method. Moreover, a mixing of the concealment signal with a random or random like signal component with a level, which is dependent on the voicing level of the speech, and a gradual attenuation of the concealment signal is typically introduced to alleviate string sounds. Sometimes, this random-like signal is derived by operations on the buffered signal or by using facilities such as random codebooks that are already available in the decoder. See U.S. Pat. No. 5,699,481, International Telecommunications Union recommendation ITU-T G.729, and Internet Engineering Task Force Request For Comments 3951 for examples of using such features. Also gradual attenuation is used to suppress introduced artefacts. Whereas this, given the underlying concealment method, may be the best choice as interpreted by a near-end listener. A far end listener, in a scenario with echo return and an adaptive filter to cancel this echo, may interpret the effect of this attenuation as predominantly negative. This is because the attenuation decreases the persistency of the excitation of the adaptive echo canceller. Thereby, the tracking of this to the actual echo path degrades, and the far end listener can experience a greater echo return.

Time-scale modification methods of the type described e.g in Linag, Farber and Girod, "Adaptive Playout Scheduling and Loss Concealment for Voice Communication over IP Networks", IEEE Transactions on Multimedia, vol. 5, no. 4, pp. 532-543, December 2003 function via a matched smooth overlap-add procedure. In this procedure a signal segment is buffered but not yet played out signal is smoothly windowed and identified as the template segment, subsequently other smoothly windowed segments are searched to identify the similar segment, where similarity can be e.g. in the correlation measure. The smoothly windowed template segment and the smoothly windowed similar segment are subsequently over-lapped and added to produce the time-scale modified signal. When the playout time-scale is extended the search region for the similar segment is positioned before the template segment in sample time. Conversely, when the playout time-scale is compressed the search region for the similar segment is positioned ahead of the template segment in sample time. In known time-scale modification methods the length of the template and similar segment and the windows applied to them are predefined before execution of the time-scale modification, these quantities are not adapted in response to characteristics of the particular signal that the time-scale modification is applied on. As observed in Linag, Farber and Girod, "Adaptive Playout Scheduling and Loss Concealment for Voice Communication over IP Networks", IEEE Transactions on Multimedia, vol. 5, no. 4, pp. 532-543, December 2003: with prior-art time-scale modification, spike delays cannot be effectively alleviated from a starting-point in a low-delay playout scheduling as needed in real-time two-way voice communication over packet networks.

Other methods with points of resemblance to the time-scale modification and pitch repetition methods are known. One type that should be mentioned in this context is sinusoidally based concealment methods. See e.g. Rødbro and Jensen, "Time-scaling of Sinusoids for Intelligent Jitter Buffer in Packet Based Telephony", in IEEE Proc. Workshop on Speech Coding, 2002, pp. 71-73. Depending on the amount of interpolation, respectively pitch repetition that are accomplished via the sinusoidal model domain by these methods, these methods are subject to the same limitations as identified for the pitch repetition and time-scale modification methods mentioned above.

SUMMARY OF THE INVENTION

The disclosed invention, or rather embodiments thereof, effectively mitigates the above-identified limitations in known solutions, e.g. audible artefacts, as well as other unspecified deficiencies in the known solutions.

Specifically comparing with known pitch-repetition based methods, the disclosed invention provides techniques to generate concealment signals representative of the sound signal, where these concealment signals contain significantly less perceptually annoying artifacts such as string sounds. Thereby alleviating a limitation of these systems with directly improved perceived sound quality as a result. Simultaneously, this is obtained while at the same time introducing significantly less attenuation in the concealment signals. Thereby alleviating a second limitation of pitch repetition based systems. This alleviation of second limitation also gives a directly improved perceived quality of the concealment signal at the near-end side of the communication. Moreover, the alleviation of second limitation gives, in systems with acoustic echoes and an adaptive filter at the near-end to mitigate the effect of acoustic echoes as perceived by the far-end, an improved perceived quality at the far-end side of the communication. This second effect is obtained because the concealment signals of the disclosed invention, because they exhibit less attenuation, provide a more persistent excitation for the adaptation process of the adaptive echo cancellation filter. Furthermore, the robustness of the disclosed technique to acoustic background noise surpasses that of known pitch-repetition-based methods.

Furthermore, and specifically comparing with known time-scale modification methods, the disclosed invention enables a concealment of spike delays in a system with low-delay play-out or output buffer scheduling, as needed in real-time two-way voice communication over packet networks. Thereby alleviating this major limitation in known time-scale modification.

In a first aspect, the invention provides a method for generating a sequence of concealment samples in connection with transmission of a digitized audio signal, wherein the method comprises generating the sequence of concealment samples from buffered samples of the digitized representation of audio signal in sample time order, wherein at least two consecutive subsequences of samples in the sequence of concealment samples are based on subsequences of buffered samples, wherein said subsequences of buffered samples are consecutive in reordered time.

The following definitions apply to the first aspect and will be used throughout the present disclosure. By a "sample" is understood a sample originating from a digitized audio signal or from a signal derived thereof or coefficients or parameters representative of such signals, these coefficients or parameters being scalar or vector valued. By a "frame" is understood a set of consecutive samples, using the definition of sample above. By "subsequence" is understood a set of one or more consecutive samples, using the above definition of sample. Thus, in a special case a subsequence equals a sample. In case of use of e.g. overlap-add, two consecutive subsequences may include overlapping samples.

Depending on the choice of frames, a subsequence may extend between two consecutive frames. In preferred embodiments, subsequences are arranged such that one subsequence can not be a subset of another subsequence.

Preferably, the at least two consecutive subsequences of samples in the sequence of concealment samples are based on subsequences of buffered samples, wherein said subsequences of buffered samples are consecutive in reverse time order. Thus, in preferred embodiments a sequence of concealment samples includes consecutive subsequences, such as consecutive samples, that are based on consecutive buffered samples in reverse time order. E.g. two, three, four or even more consecutive subsequences of samples in the sequence of concealment samples may be based on subsequences of buffered samples that are consecutive in reverse time order. In other words, the generated concealment sequence preferably includes parts that are based on a more or less direct reverse playback of buffered samples. In a preferred embodiment the sequence of concealment samples includes a set of consecutive samples of buffered samples in reverse time order. By calculating at least part of a sequence of concealment samples based on buffered samples using this reordering or reverse ordering scheme provides a more natural sounding concealment sequence without suffering from prior art string sound effects and helps to eliminate or reduce several other artefacts as well.

The described method has a large number of advantages in connection with communication systems, e.g. VoIP systems. Here digitized speech signals are transmitted in frames and where the communication is subject to frame loss and jitter and a need for a concealment sequence of samples to at least partly reduce highly audible and annoying abruption of the signal.

In preferred embodiments, a location of said buffered samples is located at a point that evolves gradually backwards and forwards in sample time during the generation of the sequence of concealment samples. This may be implemented by an index pattern generator that controls this temporal evolution. By analyzing buffered samples this index pattern generator selects the start, stops and speeds of reverse temporal evolution passages, it also control forward evolution start, stops and speeds, and a pattern by which reverse temporal evolution and forward temporal evolution are sequenced in order to produce a naturally sounding concealment sequence.

The sequence of concealment samples may start with a subsequence based on a subsequence of the buffered samples which is last in time order.

The reordering in time of subsequences may be based on a sequential process of indexing and reading samples forwards in time and stepping backwards in time. Preferably, the sequential process of indexing and reading samples comprises the step of
 a) indexing a buffered sample by stepping a number of buffered samples backwards in time order, followed by the step of
 b) reading a number of buffered samples forward in time order, starting with the buffered sample indexed in step a), and using the read samples for calculation of a subsequence of the sequence of concealment samples,
wherein the number of buffered samples read forward is different from the number of buffered samples stepped backwards. With this number being different, the periodicity that leads to unnatural string sounds are avoided. The method is further referred to as "back steps" and "read lengths" in the detailed description of embodiments in the following.

The number of buffered samples read forward may be larger than or smaller than the number of buffered samples stepped backwards. Preferably, the number of buffered samples read forward is smaller than the number of buffered samples stepped backwards. This choice will provide a method that gradually evolves further back in time in the buffered samples and thus provide a concealment sequence where subsequent samples are gradually based on older buffered samples, whereafter a forward evolution is initiated.

The subsequences of the sequence of concealment samples may be calculated from subsequences of the buffered samples by involving a weighted overlap-add procedure. The weighting functions in said weighted overlap-add procedure may additionally be a function of frequency. The weighted overlap-add procedure may be modified in response to a matching quality indicator, this matching quality indicator being a measure on two or more subsequences of samples that enter into the weighted overlap-add procedure.

The reordering in time may be partly described by a backwards and a forwards evolution of a location pointer. Preferably, the backwards evolution of said location pointer is limited by the use of a stopping criteria. The stopping criteria for said backwards evolution, the pace (or speed) of said forwards and said backwards evolution, and the number of initiated said backwards evolutions may be jointly optimized such as to optimize the sound quality when interpreted by a human listener.

Preferably, a smoothing and equalization operation is applied to the buffered samples. This may be done either before the samples are buffered, while in the buffer, or just before the samples are used to calculate concealment samples. The stopping criteria for the backwards evolution, the pace of said forwards evolution and said backwards evolution, the number of initiated said backwards evolutions, and the smoothing and equalization operation may be jointly optimized such as to optimize the sound quality when interpreted by a human listener.

The backwards and a forwards evolutions of the location pointer may be jointly optimized such as to optimize the sound quality when interpreted by a human listener.

Preferably, a phase filtering is applied to minimize discontinuities at boundaries between the sequence of concealment samples and a consecutive frame of samples. Introducing phase filtering helps reducing the well-known discontinuity problems when introducing a concealment sequence. In cases where such phase filtering is applied, the mentioned joint optimization may also include signal distortion introduced by the phase filtering such as to optimize the sound quality when perceived by a human listener.

A noise mixing may be introduced in the sequence of concealment samples. Especially, a noise mixing may be introduced in the sequence of concealment samples, and wherein said noise mixing is modified in response to the sequential process of indexing samples forwards in time and stepping backwards in time. In such cases, the sequential process of indexing samples forwards in time, and stepping backwards in time and said response to it may include the use of a matching quality indication.

An attenuation function may be applied in the sequence of concealment samples. Especially, such attenuation function may be modified in response to the sequential process of indexing samples forwards in time and stepping backwards in time. The sequential process of indexing samples forwards in time and stepping backwards in time and said response to it may include the use of a matching quality indication.

Preferably, a resulting number of samples in the sequence of concealment samples is preset, e.g. a number of samples in a concealment frame may be fixed. The number of samples is preferably independent of characteristics of the digitized audio signal. The preset number of samples preferably has a preset integer value in the range 5-1000, such as in the range 20-500, preferably depending on the actual sample frequency.

The sequence of concealment samples may be included in one concealment frame. The method may further comprise generating at least a second concealment frame consecutive to the first concealment frame, the second frame including a second sequence of concealment samples. The sequences of concealment samples in the first and second concealment frames are preferably different, i.e. consecutive copies of concealment frames are preferably avoided. Using frames including different concealment sequences lead to a more naturally sounding concealment. Preferably, the first and second concealment frames include the same number of samples.

Preferably at least one subsequence of samples in the second concealment frame is at least partly based on subsequences of buffered samples further back in time than any of the subsequences of samples included in the first concealment frame. Thus, subsequent concealment frames are preferably based on older buffered samples.

In a second aspect, the invention provides a computer executable program code adapted to perform the method according to the first aspect. Such program code may be written in a machine dependent or machine independent form and in any programming language such as machine code or higher level programming language.

In a third aspect, the invention provides a program storage device comprising a sequence of instructions for a microprocessor, such as a general-purpose microprocessor, for performing the method of the first aspect. The storage device may be any type of data storage means such as disks, memory cards or memory sticks, harddisks etc.

In a fourth aspect, the invention provides an arrangement, e.g. a device or apparatus, for receiving a digitized audio signal, the arrangement including:
  memory means for storing samples representative of a received digitized audio signal, and
  processor means for performing the method of the first aspect.

Implementing this invention with adequate means, such as the ones described for the preferred embodiments below, enables a decoder and concealment system and/or a transcoder and concealment system to efficiently conceal sequences of lost or delayed packets without introducing perceptually annoying artifacts. Moreover, this is accomplished with robustness to acoustic background noise and multiple speakers and without introducing a fast fading. The increased robustness is obtained because the method consistency, via the temporal evolution, is less dependent on strict signal periodicity than is repetition based methods. Thereby our invention enables high quality two-way communication of speech in situations with acoustic background noise, acoustic echo, and/or severe clock skew, channel loss, and/or delay jitter.

BRIEF DESCRIPTION OF THE DRAWINGS

In the following the invention is described in more details with reference to the accompanying figures, of which

Figure 1:
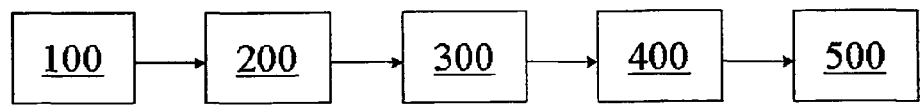
FIG. 1 is a block diagram illustrating a known end-to-end packet-switched sound transmission system subject to the effects of loss, delay, delay jitter, and/or clock skew.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF PREFERRED EMBODIMENTS

Figure 2:
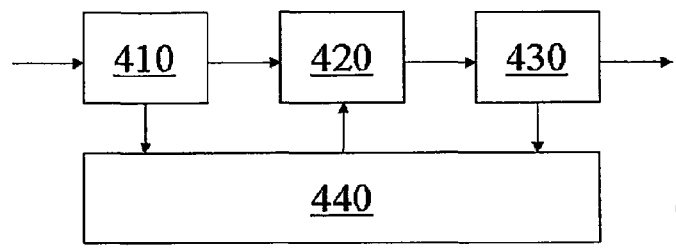
FIG. 2 is an exemplifying receiver subsystem accomplishing jitter-buffering, decoding and concealment and play-out buffering under the control of a control unit.
Figure 3:
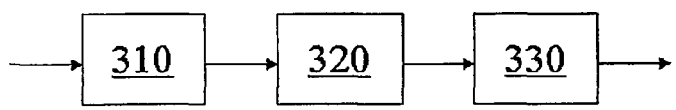
FIG. 3 is a block diagram illustrating a relay subsystem of a packet-switched channel, subject to the effects of clock skew, loss, delay, and delay jitter.
Figure 4:
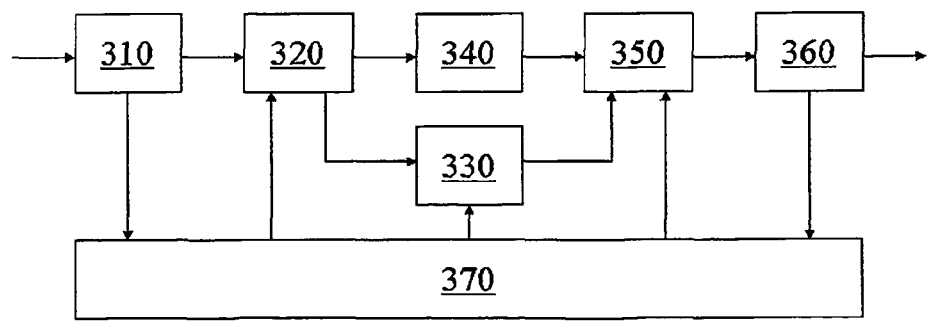
FIG. 4 is an exemplifying relay subsystem accomplishing input-buffering, output-buffering, and when necessary transcoding and concealment under the control of a control unit.

The inventive method is activated in the decoding and concealment unit 420 of a receiver such as the one in FIG. 2 or it is activated in the transcoding and concealment unit 330 of a relay such as the one in FIG. 4 or at any other location in a communication system where its action is adequate. At these locations a number of buffered signal frames are available and a number of concealment frames are wanted. The available signal frames and wanted concealment frames can consist of time-domain samples of an audio signal, e.g. a speech signal, or they can consist of samples derived thereof, such as linear prediction excitation samples, or they can consist of other coefficients derived from the audio signal and fully or partially representative of frames of sound signal. Examples of such coefficients are frequency domain coefficients, sinusoidal model coefficients, linear predictive coding coefficients, waveform interpolation coefficients, and other sets of coefficients that fully or partially are representative of the audio signal samples.

Figure 5:
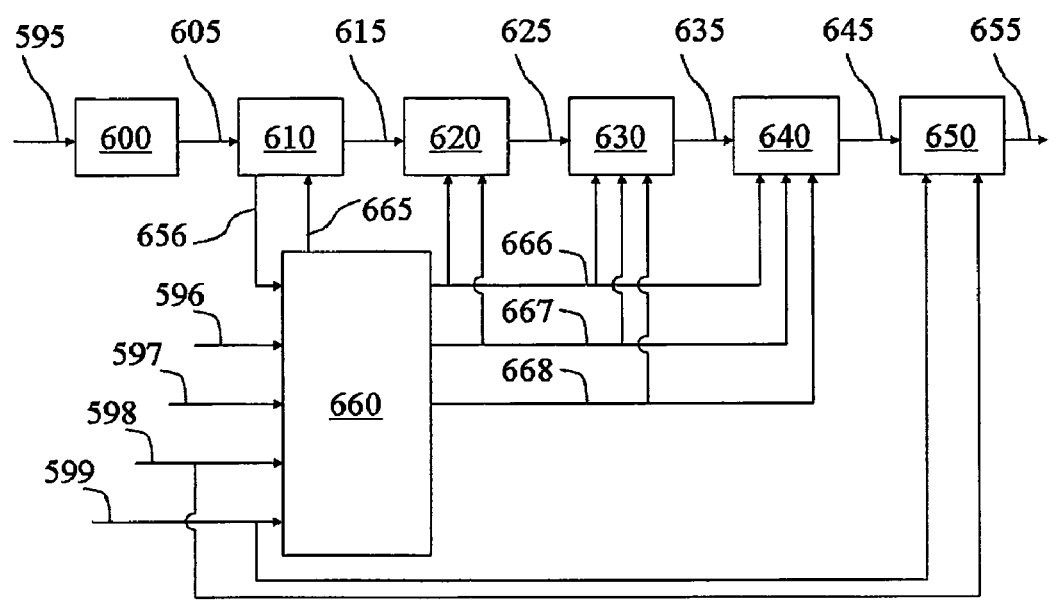
FIG. 5 is a block diagram illustrating a set of preferred embodiments of the present invention.

FIG. 5 illustrates a preferred embodiment of the invention. Following FIG. 5 the available signal frames 595, which can be received and decoded or transcoded signal frames or concealment frames from earlier operation of this or other methods to generate concealment frames or a combination of the above-mentioned types of signal frames, are stored in a frame buffer 600. The signal in the frame buffer is analyzed by an index pattern generator 660. The index pattern generator can advantageously make use of estimates of signal pitch 596 and voicing 597. Depending on the overall system design these estimates can be available for input from other processes such as an encoding, decoding, or transcoding process or they are calculated by other means preferably using state of the art methods for signal analysis. Moreover, the index pattern generator takes as input the number 598 of concealment signal frames to generate and pointers 599 to the beginning and end of the particular signal frames in the frame buffer that the concealment frame or frames are replacement for. As an example, if these buffers point to the end of the frame buffer, then this means that the concealment frame or frames should be made adequate to follow the signal stored in the frame buffer. As another example, if these pointers point out a non-empty subset of consecutive frames in the frame buffer, then this means that the concealment frame or frames should be made to replace these frames in the frame sequence representative or partially representative of the sound signal.

To illustrate this further, assume that the frame buffer 600 contains signal frames A, B, C, D, E, and that the number of concealment frames 598 is two. Then, if the pointers to frames to replace 599 points to the end of the frame buffer, this means that two concealment signal frames should be made to follow in sequence after signal frame E. Conversely, if the pointers 599 point out signal frames B, C, D, the two concealment frames should be made to replace signal frames B, C, D and to follow in sequence after signal frame A and to be followed in sequence by signal frame E.

Concerning methods to determine the number of concealment frames 598 and the subset of frames that the concealment frames should eventually replace, i.e., the pointers 599, state of the art methods should preferably be used. Thus the data 596, 597, 598, and 599 together with the signal frames 595 constitute inputs to the method device and arrangement of the present invention.

In certain overall system designs the length or dimension of a signal frame is advantageously kept as a constant during execution of the concealment unit. Among other scenarios, this is typically the case when the concealment unit is integrated in a relay system where the result of the concealment should be put into packets representative of sound signal within a time interval of preset length, this preset length being determined elsewhere. As an example, this preset length may be determined during the protocol negotiations during a call set-up in a Voice over IP system, and may be altered during the conversation in response to e.g. network congestion control mechanisms. Some embodiments of the present invention, as will become clear later, meet this requirement of working with a preset length of a signal frame in an advantageous way. However, the innovation as such is not limited to these system requirements; other embodiments of the present innovation can work with concealments that are a non-integer number of frames, and concealment frames that have time-varying lengths, and where these lengths can be functions of the specific content in the frame buffer, possibly in combination with other factors.

Embodiments of the present invention can advantageously make use of a smoothing and equalization operation 610 operating on the signal 605 from the frame buffer. This smoothing and equalization generates a signal 615 in which frames earlier in time than the concealment frame or frames have an increased similarity with the signal frame or frames that the concealment frame or frames substitute or a frame immediately before that. Alternatively, if the concealment frame or frames are inserted in sequence with the existing frames without substitution, similarity is with the frame or frames immediately before the intended position of the concealment frame or frames. For later reference, we simply term both of these cases as similarity. Similarity is as interpreted by a human listener. The smoothing and equalization obtains a signal with increased similarity, while at the same time preserving a naturally sounding evolution of the signal 615. Examples of similarity increasing operations that are advantageously performed by the smoothing and equalization 610 include increased smoothness and similarity in parameters such as energy envelope, pitch contour, voicing grade, voicing cutoff, and spectral envelope, and other perceptually important parameters.

Concerning each of these parameters, abrupt transients in evolution of the parameter within the frames to be smoothed and equalized are filtered out and the average level of the parameter in these frames is smoothly modified to become more similar in the meaning of similar defined above. Advantageously, similarity is only introduced to an extent, which still preserves a naturally sounding evolution of the signal. Under the control of the index pattern generator 660 the smoothing and equalization can advantageously mitigate transients and discontinuities that may otherwise occur in the following indexing and interpolation operation 620. Moreover, the smoothing and equalization of pitch contour can advantageously be controlled by the index pattern generator 660 in such a way as to minimize the distortion, which is eventually otherwise introduced in the concealment frames later by the phase filter 650. The smoothing and equalization operation can advantageously make use of signal or parameter substitution, mixing, interpolation and/or merging with signal frames (or parameters derived thereof) found further back in time in the frame buffer 600. The smoothing and equalization operation 610 can be left out from the system without diverging from the general scope of the present invention. In this case the signal 615 equates the signal 605 and the signal input 656 and control output 665 of the index pattern generator 660 can in that case be de omitted from the system design.

The indexing and interpolation operation 620 takes as input the, possibly smoothed and equalized, signal 615, and an index pattern 666. Furthermore, in some advantageous embodiments of the present invention the indexing and interpolation operation takes a matching quality indicator 667 as input. The matching quality indicator can be a scalar value per time instant or it can be a function of both time and frequency. The purpose of the matching quality indicator will become apparent later in this description. The index pattern 666 parameterizes the operation of the indexing and interpolation function.

Figure 5A:
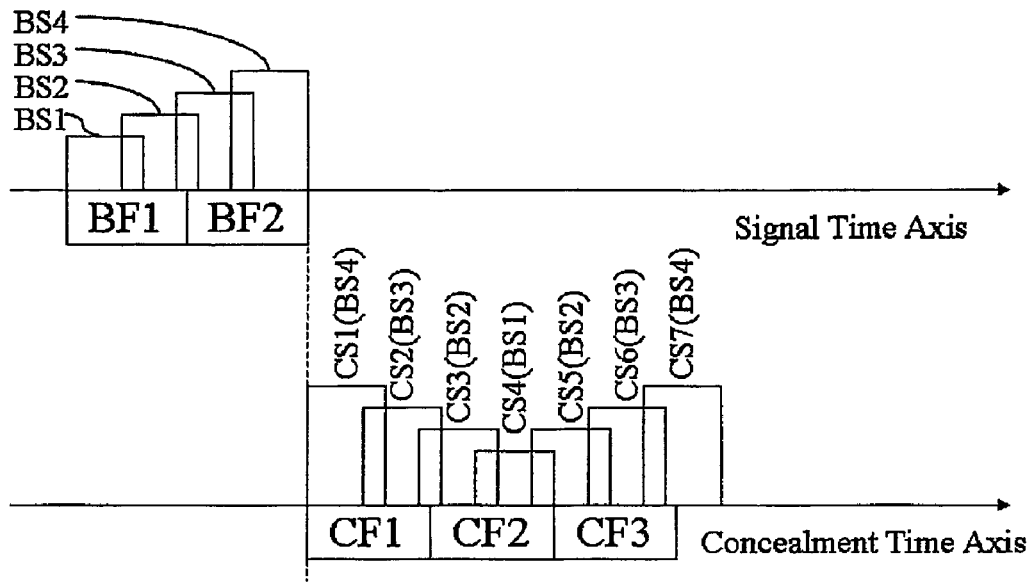
FIG. 5A is an illustrating sketch of subsequences in concealment frames starting with subsequences being based on the last buffered subsequences of in reverse time order.
Figure 5B:
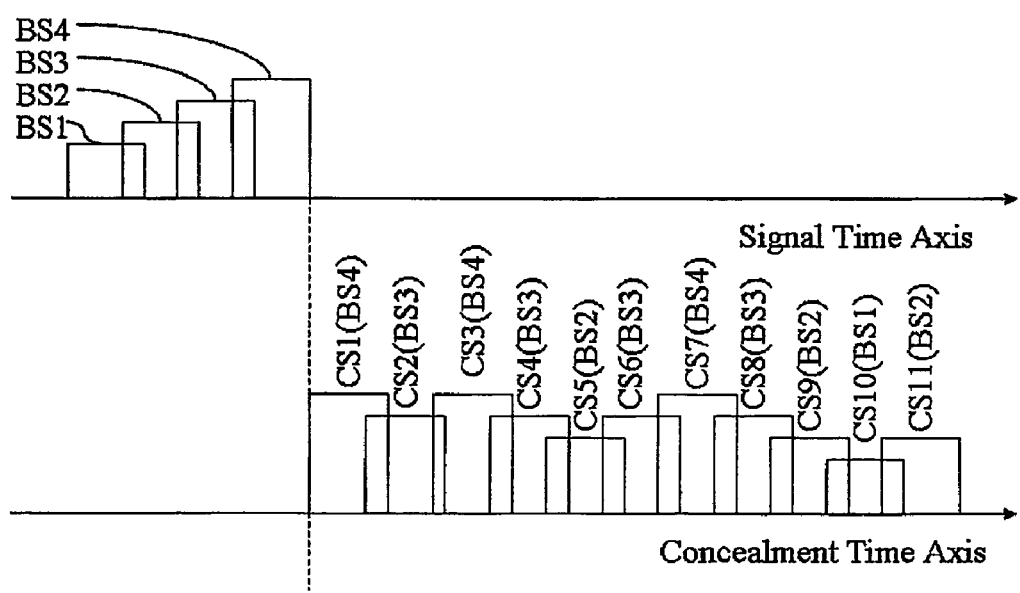
FIG. 5B illustrates another example of a larger sequence of subsequences in concealment frames starting with the last two buffered subsequences in reverse time order, and where consecutive subsequences are based on buffered subsequences further back in time.

FIG. 5A illustrates an example of how an index pattern may index subsequences in the buffered samples, BS1, BS2, BS3, BS4, gradually backwards in time in the synthesis of one or more concealment frames. In the shown example, consecutive subsequences CS1, CS2, CS3, CS, CS5, CS6, CS7 in the concealment frames CF1, CF2, CF3 are based on buffered subsequences BS1, BS2, BS3 and BS4 of samples in frames BF1, BF2. As seen, the concealment subsequences CS1-CS7 are indexed from the buffered subsequences BS1-BS4 with a location pointer that moves gradually backwards and then gradually forwards in time as expressed by the functional notation CS1(BS4), CS2(BS3), CS3(BS2), meaning that CS1 is based on BS4, and so on. Thus, FIG. 5A serves as one example of illustrating how consecutive subsequences in concealment frames may follow each other, based on consecutive buffered subsequences but reordered in time. As seen, the first four concealment subsequences CS1(BS4), CS2(BS3), CS3 (BS2) and CS4(BS1) are chosen to be based on the last four subsequences of buffered samples BS1, BS2, BS3, BS4, in consecutive order but in reverse time order, thus starting with the last buffered subsequence BS1. After the first four subsequences in reverse time order, three subsequences CS5, CS6, CS7 follow that are all based on consecutive buffered subsequences in time order, namely BS2, BS3 and BS4, respectively. The preferred index pattern is a result of the index pattern generator 660 and may vary largely with inputs 656, 596, 597, 598, and 599 to this block. FIG. 5B gives, following the notation from FIG. 5A, another illustrative example of how concealment subsequences CS1-CS11 may be based on buffered subsequences BS1-BS4 in time reordering. As seen, later concealment subsequences are gradually based on buffered subsequences further back in time. E.g. the first two consecutive concealment subsequences CS1 and CS2 are based on the last two buffered subsequences BS3, BS4, in reverse time order, whereas a later concealment subsequence e.g. CS10 is based on BS1, i.e. a buffered subsequence further back in time than those used to calculate CS1 and CS2. Thus, FIG. 5B serves to illustrate that consecutive concealment subsequences are based on buffered subsequences indexed forwards and backwards in time in a manner so that the indexing gradually evolves backwards in time.

In advantageous embodiments of the present invention, this gradual evolution backwards in time is formalized as a sequence of what we for the purpose of this description term step backs and a sequence of what we for the purpose of this description term read lengths. In simple embodiments of this format of the index pattern, a pointer to signal samples, or parameters or coefficients representative thereof, is moved backwards by an amount equal to a first step back after which an amount of samples, or parameters or coefficients representative thereof, are inserted in the concealment frame, this amount being equal to a first read length. Thereafter the pointer is moved backwards with an amount equal to a second step back and an amount of samples, or parameters or coefficients representative thereof, equal to a second read length is read out, and so forth.

Figure 5C:
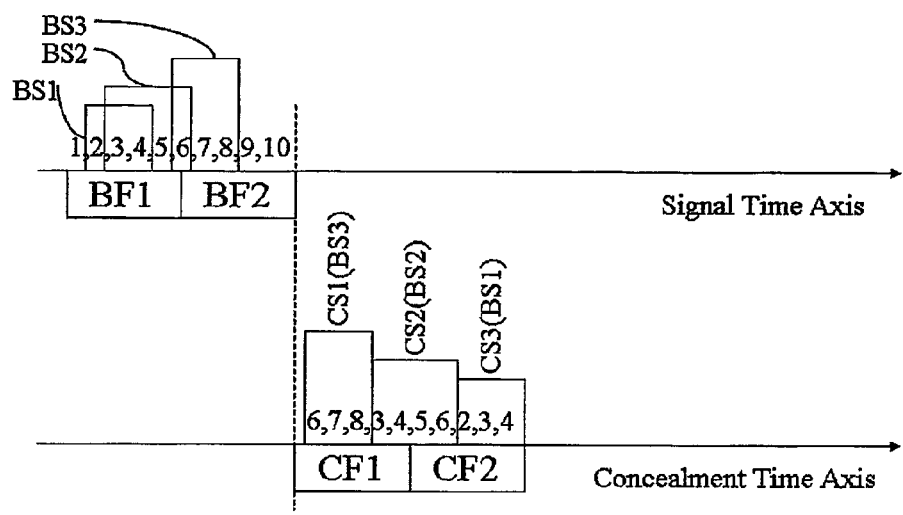
FIG. 5C illustrates the sample count indexes in an indexing pattern formatted by step backs and read lengths.

FIG. 5C illustrates an example of this process by reordering a first enumeration of indexed samples. This first enumeration is listed on the signal time axis while the enumeration list on the concealment time axis of FIG. 5C corresponds to the reordering of the original samples as they are placed in the concealment frame. For this illustrating example the first, second, and third step backs were arbitrarily chosen as 5, 6, 5, respectively, and the first, second, and third read lengths were likewise arbitrarily chosen as 3, 4, 3, respectively. In this example, the subsequences with time index sets {6,7,8}, {3,4, 5,6}, and {2,3,4}, respectively, are subsequences that evolve gradually backwards in time. The sequences of step backs and read lengths are here chosen purely for the purpose of illustration. With speech residual samples sampled at 16 kHz as an example, typical values of step backs are in the range 40 to 240, but is not limited to this range, and typical values for the read lengths are in the range of 5 to 1000 samples but is not limited to this range. In more advanced embodiments of this format, the transition from a forward directed sequence (e.g. original time or an indexed subsequence back in time) to another forward directed sequence, one step further back in time, is made gradually by a gradually shifting interpolation.

Figure 6:
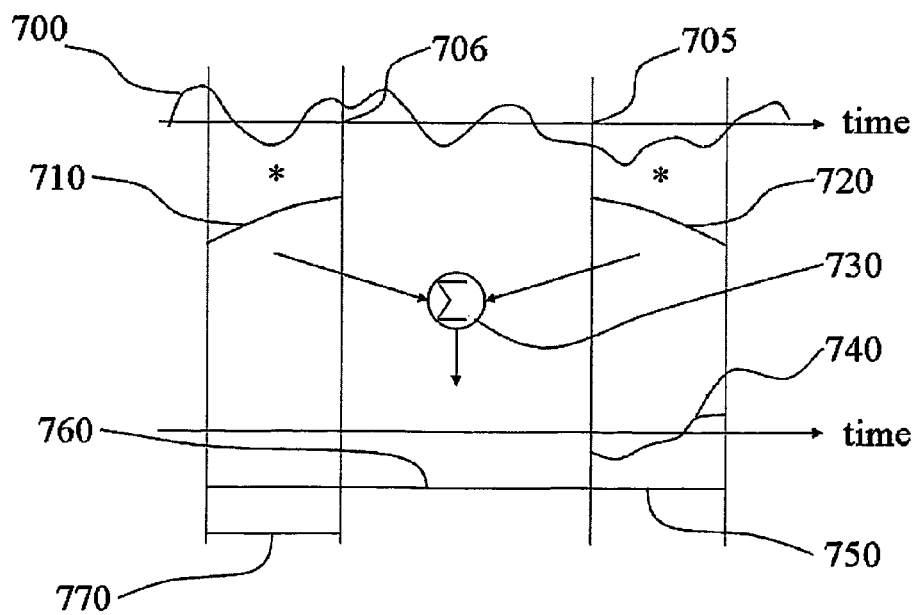
FIG. 6 is an illustrating sketch of signals involved in the indexing and interpolation function.

FIG. 6 illustrates the operation of a simple embodiment of the indexing and interpolation function in response to one step back and a corresponding read length and matching quality indicator. For the purpose of illustration only, signal frames here consist of time domain audio samples. The gradually shifting interpolation applies on the general definition of "sample" used in this description, i.e. including scalar or vector valued coefficients or parameters representative of the time domain audio samples, in a similar and thereby straightforward manner. In this FIG. 700 illustrates a segment of the signal 615. The pointer 705 is the sample time instant following the sample time instant of the last generated sample in the indexing and interpolation output signal 625. The time interval 750 has a length equal to the read length. The time interval 770 also has a length equal to the read length. The time interval 760 has a length equal to the step back. The signal samples in 700 starting from time 705 and read length forward in time are one by one multiplied with a windowing function 720. Also the signal samples in 700 starting at a location one sample after step back before the location 706 and read length samples ahead from there are one by one multiplied with a windowing function 710. The resulting samples from multiplying with window 710 and with window 720 are added one by one 730 to result in the samples 740 that constitute a new batch of samples for the output 625 from the indexing and interpolation operation. Upon completion of this operation the pointer 705 moves to the location 706.

In simple embodiments of the present invention the window functions 710 and 720 are simple functions of the read length 750. One such simple function is to choose the window 710 and the window 720 as the first and second half, respectively, of a Hanning window of length two times read length. Whereas a wide range of functions can be chosen here, observe that for such functions to be meaningful in the context of the present invention, they must accomplish a weighted interpolation between the samples in the segment indicated by 750 and the samples indicated by 770 in such a way that we gradually, but not necessarily monotonically, move from a high weight on the segment indicated by 750 to a high weight on the segment indicated by 770.

In other embodiments of the present invention the window functions 710 and 720 are functions of the matching quality indicator. A simple example of such a function is that, depending on a threshold on normalized correlation on the segments of the signal 700 indicated by time intervals 750 and 770, an interpolation operation is chosen to either sum to unity in amplitudes or in powers. Another example of such function avoids the constraint to sum up amplitudes or powers to one, but instead optimize window weights as a function of the matching measure only. Further refinement of this method takes the actual value of the normalized correlation and optimizes the interpolation operation in response to it, e.g. using classical linear estimation methods. However, examples of preferred methods are described in the following. In these examples the threshold, respectively the actual value of normalized correlation give examples of advantageous information conveyed by the matching quality indicator 667. According to preferred embodiments described in the following, the interpolation operation can be made to implement different weightings at different frequencies. In this case the matching quality indicator 667 can advantageously convey measures of matching as a function of frequency. In advantageous embodiments this weighting as a function of frequency is implemented as a tapped delay line or other parametric filter form that can be optimized to maximize the matching criterion.

In FIG. 6 an illustration is given of the operation of indexing and interpolation when the signal 615 (and therefore the signal segment 700) contain samples that are representative of time-domain samples of a sound signal or of a time-domain signal derived thereof. As mentioned above, samples in frames 595 and thereby in signals 605 and 615 can advantageously be such that each sample is a vector (vector valued samples) where such a vector contains coefficients or parameters, which are representative or partially representative of the sound signal. Examples of such coefficients are line spectral frequencies, frequency domain coefficients, or coefficients defining a sinusoidal signal model, such as sets of amplitudes, frequencies, and phases. With a basis in this detailed description of preferred embodiments of the present invention, the design of interpolation operations that are advantageously applied to vector valued samples is feasible to a person skilled in the art, as the remaining details can be found described in the general literature for each of the specific cases of such vector valued samples.

It is advantageous for the understanding of the present invention to observe that when the indexing and interpolation operation is applied repeatedly with a read length that is smaller than the step back, then the result will be that the samples in the signal 625 become representative of signal samples that are gradually further and further back in the signal 615. When then the step back and or read length is changed such that the read length becomes larger than the step back, then this process will turn and samples in the signal 625 now becomes representative of signal samples that are gradually further and further forward in the signal 615. By advantageous choice of the sequence of step backs and the sequence of read lengths a long concealment signal with rich and natural variation can be obtained without calling for samples ahead in time from the latest received signal frame in the frame buffer 600 or even without calling for samples ahead of another preset time instant, which can be located earlier than the latest sample in the latest received frame in the frame buffer 600. Thereby concealment of delay spikes in a system with low-delay playout or output-buffer scheduling becomes possible with the present invention. In the formulation of the present description the simple strict backwards temporal evolution of the signal, which can be useful to think of as an element in a simple embodiment of the present invention, is realized by repeated use of a read length of one sample, a step back of two samples and a window 720 comprising of a single sample of value 0 and a window 710 comprising of a single sample of value 1.0.

The primary object of the index pattern generator 660 is to control the action of the indexing and interpolation operation 620. In a set of preferred embodiments this control is formalized in and indexing pattern 666, which can consist of a sequence of step backs and a sequence of read lengths. This control can be further augmented with a sequence of matching quality indications, which in turn each can be functions e.g. of frequency. An additional feature, which can be output from the index pattern generator, and which use will become clear later in this description is a repetition count 668. The meaning of repetition count is the number of times that an evolution backwards in time is initiated in the construction of the concealment frame or frames. The index pattern generator obtains these sequences from a basis in information, which can comprise the smoothed and equalized signal 656 output from the smoothing and equalization operation 610; a pitch estimate 596 a voicing estimate 597 a number 598 of concealment frames to generate and pointers 599 to the frames to replace. In one embodiment of the index pattern generator it will enter different modes depending on the voicing indicator. Such modes are exemplified below.

As an example advantageously used in the linear predictive excitation domain, if the voicing indicator robustly indicates that the signal is unvoiced speech or that no active speech is present in the signal, i.e., the signal consists of background noise, the index pattern generator can enter a mode in which a simple reversion of the temporal evolution of the signal samples is initiated. As described earlier this can be accomplished e.g. by submitting a sequence of step back values equal to two and a sequence of read length values equal to one (this description is based in the design choice that the indexing and interpolation operation will itself identify these values and apply the adequate windowing function as described above). In some cases this sequence can continue until a reverse temporal evolution of the signal has been implemented for half of the number of new samples needed in the concealment frame or frames, after which the values in the step back sequence can change to 0, whereby a forward temporal evolution of the signal is commenced, and continue until the pointer 706 is effectively back at the point of departure for the pointer 705 in the first application of the step back. However, this simple procedure will not always be sufficient for high quality concealment frames. An important task of the index pattern generator is the monitoring of adequate stopping criteria. In the above example, the reverse temporal evolution may bring the pointer 706 back to a position in the signal at which the sound, as interpreted by a human listener, is significantly different from the starting point. Before this occurs the temporal evolution should be turned.

Preferred embodiments of the present invention can apply a set of stopping criteria based in a set of measures. The following exemplifies a few of these measures and stopping criteria. If the voicing indicates that the signal at the pointer 706 is voiced, then in the above example starting from unvoiced, the temporal evolution direction can advantageously be turned, also if the signal energy in an area round the pointer 706 is different (as determined by an absolute or relative threshold) from the signal energy at the point of departure for the pointer 705, the temporal evolution direction can advantageously be turned. As a third example the spectral difference between a region around the point of departure for the pointer 705 and the current position of the pointer 706 may exceed a threshold and the temporal evolution direction should be turned.

A second example of a mode can be evoked when the signal cannot robustly be determined as unvoiced or containing no active speech. In this mode the pitch estimate 596 constitutes a basis for determining the index pattern. One procedure to do this is that each step back is searched to give a maximized normalized correlation between the signal from pointer 705 and one pitch cycle ahead in time and the signal from a point that is step back earlier than the pointer 705 and one pitch cycle ahead. The search for potential values of step back can advantageously be constrained to a region. This region can advantageously be set to plus minus 10 percent round the previously found step back or the pitch lag if no previous step back has been found. Once the step back has been determined the value of read length will determine if the temporal signal evolution should evolve backwards or forwards in time, and how fast this evolution should take place. A slow evolution is obtained by a choice of read length close to the identified value of step back. A fast evolution is obtained by a choice of read length that is much smaller or much larger than the step back in the case of backwards and forwards evolution, respectively. An objective of the index pattern generator is to select the read length to optimize the sound quality as interpreted by a human listener. Selecting the read length too close to the step back can in some signals, such as signals that are not sufficiently periodic, result in perceptually annoying artefacts such as string sounds. Selecting the read length too far from the step back, implies that a larger time interval in the frame buffer is ultimately swept through during the temporal evolution of the concealment frame or frames, alternatively that the direction of temporal evolution has to be turned more times before sufficient amount of samples for the concealment frame or frames have been generated.

The first case can in some signals, such as signals that are not sufficiently stationary (alternatively not sufficiently smooth and equalized), result in a kind of perceptually annoying artefacts that has certain resemblance with a stuttering in the sound of the concealment frame or frames. In the second case string-sound-like artefacts may occur. A feature of advantageous embodiments of the present invention is that the read length can be determined as a function of the step back and the normalized correlation, which is optimized in the search for the optimum step back. One simple, yet advantageous, choice of this function in embodiments of the present invention working on speech signals and when signal frames contain 20 ms of linear predictive excitation signal sampled at 16 kHz, is as an example given by the following function ReadLength=[(0.2+NormalizedCorrelation/3)*StepBack]

Where square brackets [ ] are used to indicate rounding to nearest integer and where symbols ReadLength, NormalizedCorrelation, and StepBack are used to denote the read length the normalized correlation obtained for the optimum step back and the corresponding step back, respectively. The above function is included only as an example to convey one advantageous choice in some embodiments of the present invention. Any choice of read length including any functional relation to obtain this read length are possible without diverging from the spirit of the present invention. In particular, advantageous methods to select the read length include the use of control 665 to parameterize the smoothing and equalization operation 610 such as to reach a joint minimization of stutter-like and string sound-like artefacts in an intermediate concealment frame 625. This explains why the index pattern generator 660 takes the intermediate signal 656 as input rather than the output 615 from the smoothing and equalization operation: the signal 656 represents potential versions of the final signal 615 under the control 665, and enables the index pattern generator to approach the optimization task by means of iterations. As is the case for the unvoiced and non-active speech mode above, the stopping criteria are essential in this mode too. All the examples of stopping criteria put forward in the mode above apply to this mode as well. Additionally, in this mode stopping criteria from measuring on the pitch and normalized correlation can advantageously be part of embodiments of the present invention.

Figure 7:
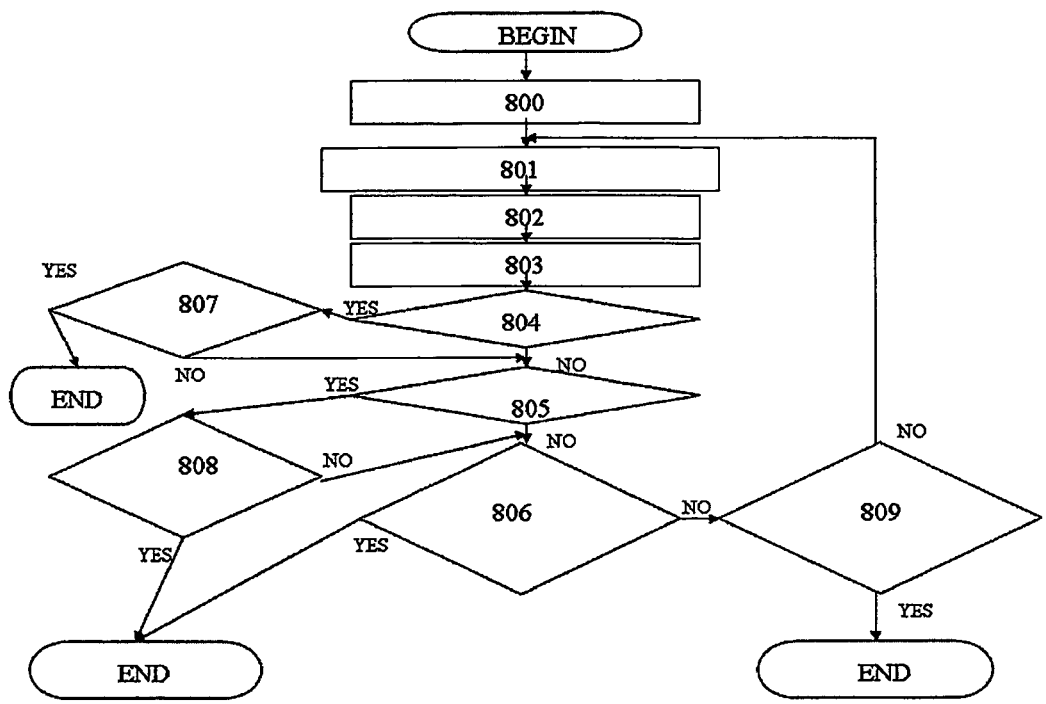
FIG. 7 is a flow chart illustrating one possible way to implement a decision-logic for stopping criteria.

FIG. 7 illustrates, as an example, an advantageous decision logic for a combination of stopping criteria. In FIG. 7, the reference signs indicate the following:

800: Identify if signal is high correlation type, low correlation type or none of these. Determine initial energy level

801: Determine next step back and normalized correlation and read length

802: Determine if signal has entered low correlation type

803: Determine if signal has entered high correlation type

804: Is signal high correlation type?

805: Is signal low correlation type?

806: Is energy below relative minimum threshold or above relative maximum threshold?

807: Is normalized correlation below threshold for high correlation type?

808: Is normalized correlation above threshold for low correlation type?

809: Has enough samples been generated?

In the case of operation in the linear predictive excitation domain of speech sampled at 16 kHz. The thresholds addressed in FIG. 7 can advantageously be chosen as follows: high correlation type can be entered when a normalized correlation greater than 0.8 is encountered; a threshold for remaining in high correlation type can be set to 0.5 in normalized correlation; low correlation type can be entered when a normalized correlation lower than 0.5 is encountered; a threshold for remaining in low correlation type can be set to 0.8 in normalized correlation; a minimum relative energy can be set to 0.3; and a maximum relative energy can be set to 3.0. Furthermore, other logics can be used and other stopping criteria can be used in the context of the present invention without diverging from the spirit and scope of the present invention.

The application of stopping criteria means that a single evolution, backwards in time until either enough samples are generated or a stopping criterion is met and then forward in time again, is not guaranteed to give the needed number of samples for the concealment frames. Therefore, more evolutions, backwards and forwards in time, can be applied by the index pattern generator. However, too many evolutions back and forth may in some signals create string-sound-like artefacts. Therefore, preferable embodiments of the present invention can jointly optimize the stopping criteria, the function applied in calculation of the read lengths, the smoothing and equalization control 665, and the number of evolutions back and forth, i.e., the repetition count 668, and if enabled by the pointers to the frames to replace 599, also the number of samples that we evolve forward in time before each new evolution backwards in time is initiated. To this end, the smoothing and equalization operation can also advantageously be controlled so as to slightly modify the pitch contour of the signal. Furthermore, the joint optimization can take into account the operation of the phase filter 650, and make slight changes to the pitch contour such as to result in an index pattern that minimize the distortion introduced in the phase filter jointly with the other parameters mentioned above. With a basis in the description of preferred embodiments for the present invention, a person skilled in the art understands that a variety of general optimization tools apply to this task, these tools include iterative optimization, Markov decision processes, Viterbi methods, and others. Any of which are applicable to this task without diverging from the scope of the present invention.

Figure 8:
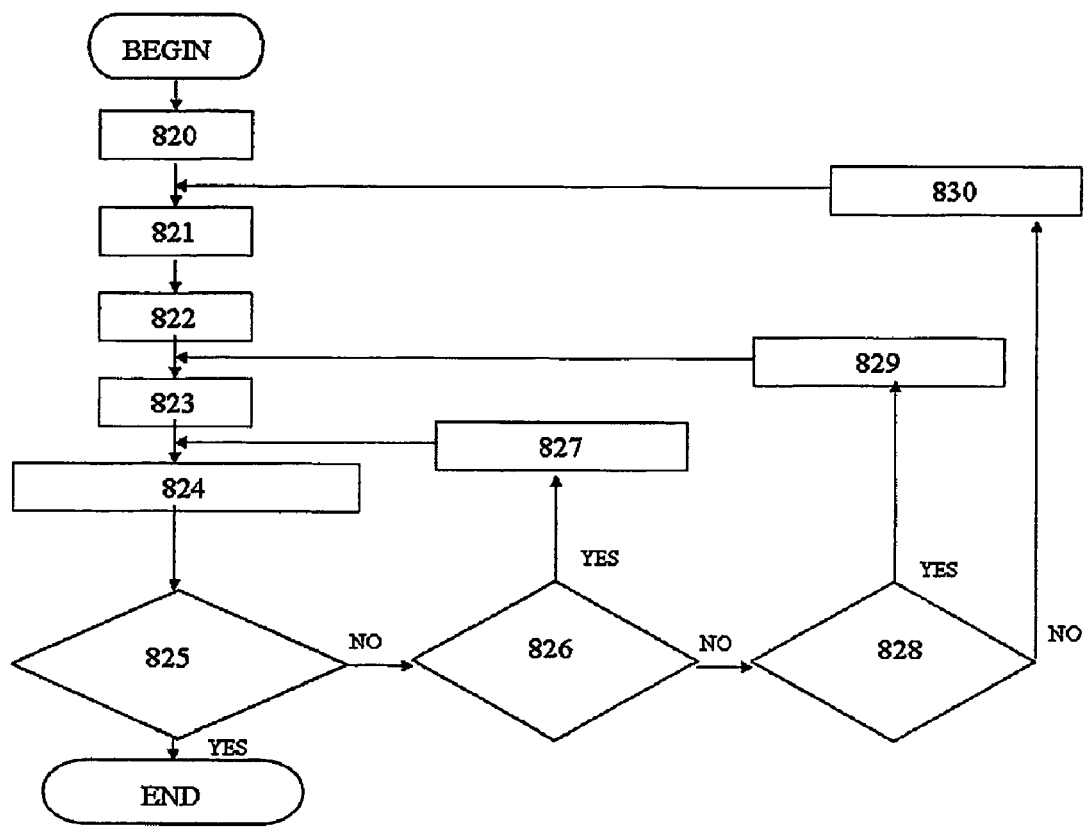
FIG. 8 is a flow chart illustrating one possible way to accomplish an iterative joint optimization of smoothing and equalization, stopping criteria and the number of allowed repetitions.

FIG. 8 illustrates by means of a flow graph one example of an iterative procedure to accomplish a simple, yet efficient, optimization of these parameters. In FIG. 8, the reference signs indicate the following:

820: Initiate controls for smoothing and equalization 665
821: Obtain new smooth signal 656
822: Initiate stopping criteria
823: Initiate the allowed number of repetitions
824: Identify the index pattern for a sequence of backwards and forwards evolutions evenly distributed over the available frames indicated by pointers 599 or if pointing to end of available frames, evolutions backwards following directly after evolutions forwards
825: Is the sufficient amount of samples for the number of concealment frames 598 generated?
826: Is the maximum number of repetitions reached?
827: Augment allowed number of repetitions
828: Is the loosest threshold for stopping criteria reached?
829: Loosen the thresholds for stopping criteria
830: Change controls to increase the impact of smoothing and equalization Note that one evolution backwards and forwards in time and a following evolution backwards and forwards in time, in the case enough signal had not been synthesized in the previous evolution or evolutions backwards and forwards in time, can advantageously differ. As examples, the sequences of step backs, read lengths, and interpolation functions, and also the end location pointer after evolution backwards and forwards in time should be devised such as to minimize periodicity artefacts otherwise resulting from a repetition of similar index patterns. With voiced speech residual domain samples at 16 kHz as an example, one evolution backwards and forwards in time, generating approximately, say, 320 samples, can preferably end approximately 100 samples further back in the signal than an earlier evolution backwards and forwards in time.

The disclosed embodiments up to this point efficiently mitigates the problems of artificially sounding string sounds known from prior art methods, while at the same time enable efficient concealment of abrupt delay jitter spikes and abruptly occurring repeated packet losses. However, in adverse network conditions, as encountered e.g. in some wireless systems and wireless ad hoc networks and best effort networks and other transmission scenarios, even the disclosed method may in some cases introduce slight components of tonality in the concealment frames. A minor noise mixing operation 630 and a graceful attenuation filter 640 can therefore advantageously be applied in some embodiments of the present invention. The general techniques of noise mixing and attenuation are well known to a person skilled in the art. This includes the advantageous use of frequency dependent temporal evolution of the power of the noise component and frequency dependent temporal evolution of the attenuation function. A feature specific to the use of noise mixing and attenuation in the context of the present invention is the explicit use of the index pattern 666, the matching quality measure 667 and/or the repetition count 668 for adaptive parameterization of the noise mixing and attenuation operations. Specifically, the indexing pattern indexes where unaltered signal samples are placed in the concealment frame and where the samples of the concealment frame is a result of an interpolation operation. Moreover, the ratio of step back relative to read length in combination with the matching quality measure are indicative of the perceptual quality resulting from the interpolation operation. Thus little or no noise can advantageously be mixed into the original samples, more noise can advantageously be mixed into the samples that are results of an interpolation process and the amount of noise mixed into these samples can advantageously be a function of the matching quality measure, advantageously in a frequency differentiated manner. Furthermore, the value of the read length relative to the step back is also indicative of the amount of periodicity that may occur, the noise mixing can advantageously include this measure in the determination of amount of noise to mix into the concealment signal. The same principle applies to the attenuation; a graceful attenuation is advantageously used, but less attenuation can be introduced for samples that are representative of original signal samples and more attenuation can be introduced for samples that result from the interpolation operation. Furthermore, the amount of attenuation in these samples can advantageously be a function of the matching quality indication and advantageously in a frequency differentiated manner. Again, the value of the read length relative to the step back is indicative of the amount of periodicity that may occur; the attenuation operation can advantageously include this measure in the design of the attenuation.

As addressed in the background for the present invention, an important object of a subset of embodiments of the present invention obtains concealment frames of preset length equal to the length of regular signal frames. When this is wanted from a system perspective, the means to this end can advantageously be a phase filter 650. A computationally simple, approximate but often sufficient operation of this block is to accomplish a smooth overlap add between samples that surpass the preset frame length times the number of concealment frames with a tailing subset of samples from the frame following the concealment frames. Seen isolated, this method is well known from the state of the art and used e.g. in International Telecommunications Union recommendation ITU-T G.711 Appendix 1. When practical from a system perspective the simple overlap-add procedure can be improved by a multiplication of subsequent frames with −1 whenever this augments the correlation in the overlap-add region. However, other methods can advantageously be used, e.g. in the transition between voiced signal frames, to mitigate further the effect of discontinuities at the frame boundaries. One such method is a re-sampling of the concealment frames. Seen as an isolated method, this too is well known from the state of the art. See e.g. Valenzuela and Animalu, "A new voice-packet reconstruction technique", IEEE, 1989. Thus, mitigating discontinuities at frame boundaries may be performed by a person skilled in the art. However, in preferred embodiments of the invention disclosed herewith, the re-sampling can advantageously be continued into the frames following the last concealment frame. Hereby the slope of temporal change and thereby the frequency shift, which is a consequence of the re-sampling technique, can be made imperceptible when interpreted by a human listener. Further, rather than re-sampling, the use of time-varying all-pass filters to mitigate discontinuities at frame boundaries is disclosed with the present invention. One embodiment of this, is as given by the filter equation $$H\_L(z,t)=(\text{alpha}\_1(t)+\text{alpha}\_2(t)*z^{\wedge}(-L))/(\text{alpha}\_2(t)+\text{alpha}\_1(t)*z^{\wedge}(-L))$$

The function of which is explained as follows. Suppose that a sweep from a delay of L samples to a delay of 0 samples is wanted over a sweep interval, which can include all or part of the samples in all or part of the concealment frames; in frames before the concealment frames; and in frames after the concealment frames. Then in the beginning of the sweep interval alpha_1($t$) is set to zero and alpha_2($t$) it set to 1.0 so as to implement a delay of L samples. As the sweep over t starts, alpha_1($t$) should gradually increase towards 0.5 and alpha_2($t$) should gradually decrease towards 0.5. When, in the end of the sweep interval alpha_1($t$) equates alpha_2($t$) the filter H_L(z,t) introduce a delay of zero. Conversely if a sweep from a delay of zero samples to a delay of L samples is wanted over a sweep interval, which can include all or part of the samples in all or part of the concealment frames; in frames before the concealment frames; and in frames after the concealment frames. Then in the beginning of the sweep interval alpha_1($t$) is set to 0.5 and alpha_2($t$) it set to 0.5 so as to implement a delay of 0 samples. As the sweep over t starts, alpha_1($t$) should gradually decrease towards 0 and alpha_2($t$) should gradually increase towards 1.0. When, in the end of the sweep interval alpha_1($t$) equates 0 and alpha_2($t$) equates 1.0 the filter H_L(z,t) introduce a delay of L samples.

The above filtering is computationally simple, however it has a non-linear phase response. For perceptual reasons, this non-linear phase limits its use to relatively small L. Advantageously L<10 for speech at a sample rate of 16 kHz. One method to accomplish the filtering for larger values of initial L is to initiate several filters for smaller L values that sums up to the desired total L value, these several filters can advantageously be initiated at different instants of time and sweep their range of alpha's over different intervals of time. One other method to increase the range of L in which this filter is applicable is disclosed in the following. A structure that implements a functionally same filtering as the one above is to divide the signal into L poly-phases and conduct the following filtering in each of these poly-phases $$H\_1(z,t)=(\text{alpha}\_1(t)+\text{alpha}\_2(t)*z^{\wedge}(-1))/(\text{alpha}\_2(t)+\text{alpha}\_1(t)*z^{\wedge}(-1))$$

By the present invention the poly-phase filtering is advantageously implemented by use of up-sampling. One way to do this advantageously is to up-sample each poly-phase with a factor K and conduct the filtering H_1(z,t) K times in each up-sampled poly phase before down-sampling with a factor K and reconstruction of the phase modified signal from the poly-phases. The factor K can advantageously be chosen as K=2. By the up-sampling procedure, a phase response, which is closer to linear, is obtained. Hereby the perceived quality as interpreted by a human listener is improved.

The above described phase adjustment over multiple frames is applicable when concealment frames are inserted in a sequence of received frames without loss. It is also applicable when frames are taken out of the signal sequence in order to reduce playback delay of subsequent frames. And it is applicable when frames are lost and zero or more concealment frames are inserted between the received frames before and the received frames after the loss. In these cases, an advantageous method to get the input signal for this filter and find the delay L is as follows:

1) on the frames earlier in time than the discontinuity point, a concealment method, the one disclosed herewith or any other, is continued or initiated.
2) on the frames later in time than the discontinuity a number L_test samples are inserted in the frame start by a concealment method, the one disclosed herewith or any other, but with an reversed indexing of the time samples.
3) a matching measure, such as normalized correlation, is applied between the concealment frame or frames form 1) and the frame or frames from 2) including the heading L_test samples.
4) The L_test that maximizes the matching measure is selected as L.
5) The concealment frame or frames from 2) and the frame or frames from 3) are now added together using a weighted overlap-add procedure. Whereas this weighted overlap-add can be performed as known by a person skilled in the art, it can preferably be optimized in as disclosed later in this description.
6) The resulting frame or frames are used as input to the above described phase fitting filtering, initiated with the determined value L. If L is larger than a threshold, then several filters are initiated and coefficient swept at different time instants and time intervals, with their L-values summing up to the determined value L.

Advantageously, in speech or speech residual sampled at 8 or 16 kHz, the above threshold can be chosen to a value in the range 5 to 50. Further advantageously, in voiced speech or voiced speech residual, the concealment samples L_test and its continuation into the following frame are obtained by circular shifting the samples of the first pitch period of the frame. Thereby a correlation measure without normalization, correlating the full pitch period, can advantageously be used as matching measure to find the preferred circular shift L.

Figure 9:
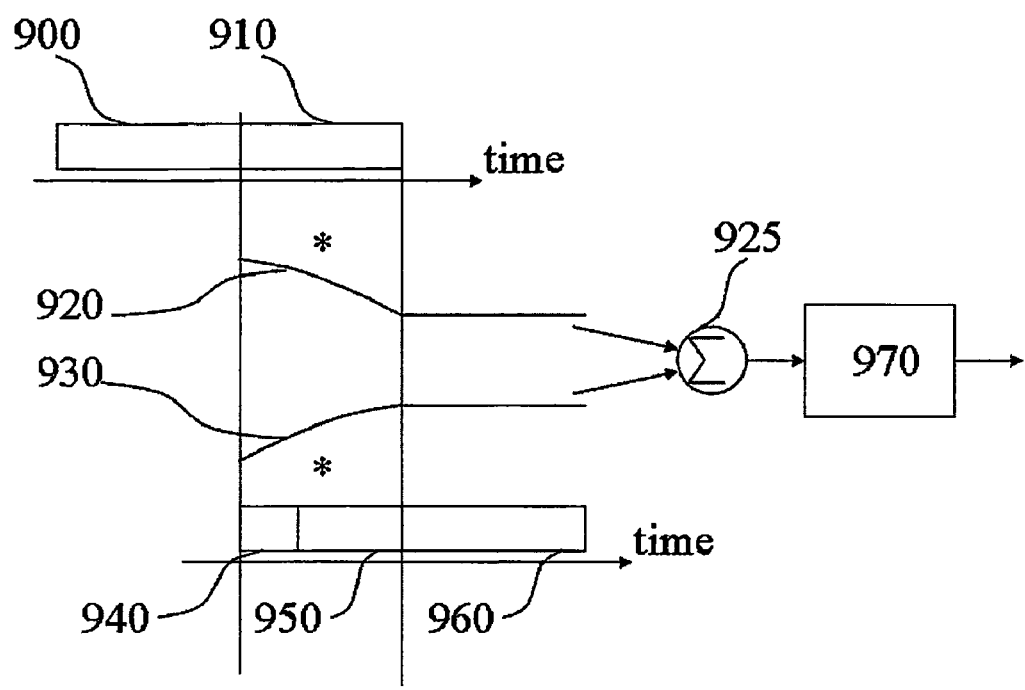
FIG. 9 illustrates the use of circular shift and overlap-add in connection with initializing and feeding a phase adjusting filter.

FIG. 9 illustrates one embodiment of such method. In this figure, the phase adjustment creates a smooth transition between a signal frame 900 and the following frames. This is accomplished as follows: From the signal frame 900 and earlier frames, a concealment signal 910 is generated. This concealment signal can be generated using the methods disclosed herewith, or by using other methods that are well known from the state of the art. The concealment signal is multiplied with a window 920 and added 925 with another window 930, which is multiplied with a signal generated as follows: A concealment signal 940 is generated, from following samples 950 and possibly 960, by effectively applying a concealment method such as the ones disclosed herewith, or using other methods that are well known from the state of the art, and concatenated with the following samples 950. The number of samples in the concealment 940 is optimized such as to maximize the matching between the concealment 910 and the concatenation of 940 and the following samples 950.

Advantageously, normalized correlation can be used as a measure of this matching. Further, to reduce computational complexity, the matching can for voiced speech or voiced speech residual be limited to comprise one pitch period. In this case the concealment samples 940 can be obtained as a first part of a circular shift of one pitch period, and the correlation measure over one pitch period now need not be normalized. Hereby computations for calculation of the normalization factor are avoided. As for the indexing and interpolation operation described earlier in this detailed description of preferred embodiments, the windows can again advantageously be a function of a matching quality indicator and/or a function of frequency and advantageously implemented as a tapped delay line. The operation of the filter 970 is as follows. The first L samples resulting from the overlap-add procedure are passed directly to its output, and used to set up the initial state of the filter. Thereafter the filter coefficients are initialized as described above, and as the filter filters from sample L+1 and forwards these coefficients are adjusted gradually, such as to gradually remove the L samples of delay, as disclosed above.

Again, in the above described procedure, the method of optimizing the weights of the windows according to maximizing the matching criterion, as described above, applies, and also the generalization of the window functions to frequency dependent weights and to matched filters in the form of tapped delay lines or other parametric filter forms. In advantageous embodiments the temporal evolution of the frequency dependent filter weight is obtained by a sequence of three overlap-add sequences, first fades down the concealment frame or frames from earlier frames, second fades up a filtered version of these with a filter such as to match the concealment frames from later frames obtained in reverse indexed time, then fades this down again, third fades up the frame or frames later in time. In another set of advantageous embodiments the temporal evolution of the frequency dependent filter weight is obtained by a sequence of four overlap-add sequences, first fades down the concealment frame or frames from earlier frames, second fades up a filtered version of these with a filter such as to match the concealment frames from later frames obtained in reverse indexed time, then fades this down again, third fades up a filtered version of the frames later in time, such as to further improve this match, and fades that down again, and finally fourth window fades up the frame or frames later in time. Further advantageous embodiments of weighted overlap-add methods are disclosed later in this description.

Concerning the smoothing and equalization operation 610 in embodiments where residual-domain samples are used as a part of the information representative for the speech signal, smoothing and equalization can advantageously be applied on this residual signal using pitch adapted filtering, such as a comb filter or a periodic notch filter. Furthermore, Wiener or Kalman filtering with a long-term correlation filter plus noise as a model for the unfiltered residual can advantageously be applied. In this way of applying the Wiener or Kalman filter, the variance of the noise in the model applies to adjust the amount of smoothing and equalization. This is a somewhat counterintuitive use, as this component is traditionally in Wiener and Kalman filtering theory applied to model the existence of an unwanted noise component. When applied in the present innovation the purpose is to set the level of smoothing and equalization. As an alternative to pitch adapted comb or notch filtering and Wiener or Kalman type filtering, a third method is advantageously applied for smoothing and equalization of residual signals in the context of the present innovation. By this third method, either sample amplitudes, as advantageously applied e.g. for unvoiced speech, or consecutive vectors of samples, as advantageously applied e.g for voiced speech, are made increasingly similar. Possible procedures for accomplishing this are outlined below for vectors of voiced speech and samples of unvoiced speech, respectively.

For voiced speech, consecutive samples of speech or residual are gathered in vectors with a number of samples in each vector equal to one pitch period. For convenience of description we here denote this vector as v(k). Now the method obtains a remainder vector r(k) as a component of v(k) that could not by some means be found in surrounding vectors v(k−L1), v(k−L1+1), . . . , v(k−1) and v(k+1), v(k+2), . . . , v(k+L2). For convenience of description, the component found in surrounding vectors is denoted a(k). The remainder vector r(k) is subsequently manipulated in some linear or non-linear manner so as to reduce its audibility, while preserving naturalness of the resulting reconstructed vector, which is obtained by reinserting the component a(k) in the manipulated version of r(k).

This leads to the smoothed and equalized version of voiced speech or voiced residual speech. One simple embodiment of the above described principle, using for convenience matrix-vector notation and for simplicity of example the notion of linear combining and least-squares to define a(k) is given below. This merely serves as one example of a single simple embodiment of the above general principle for smoothing and equalization.

For the purpose of this example, let the matrix M(k) be defined as $$M(k)=[v(k-L1)v(k-L1+1) \ldots v(k-1)v(k+1)v(k+2) \ldots V(k+L2)]$$

From which a(k) can be calculated e.g. as the least-squares estimate of v(k) given M(k)

$$a(k)=M(k)\mathrm{inv}(\mathrm{trans}(M(k))M(k))v(k)$$

where inv( ) denotes matrix inversion or pseudo inversion and trans( ) denotes matrix transposition. Now the remainder r(k) can be calculated e.g. by subtraction.

$$r(k)=v(k)-a(k)$$

One example of manipulating r(k) is by clipping away peaks in this vector, e.g., such as to limit the maximum absolute value of a sample to a level equal to the maximum amplitude of the r(k) vector closest to the starting point of the backward-forward concealment procedure, or to some factor times the amplitude of the sample at the same position in vector but in the vector closest to the starting point of the backward-forward concealment procedure. The manipulated remainder rm(k) is subsequently combined with the a(k) vector to reconstruct the equalized version of v(k), for convenience here denoted by ve(k). This combination can as one example be accomplished by simple addition:

$$ve(k)=\mathrm{alpha}*rm(k)+a(k)$$

The parameter alpha in this example can be set to 1.0 or can advantageously be selected to be smaller than 1.0, one advantageous choice for alpha is 0.8.

For unvoiced speech, another smoothing and equalization method can with advantage be used. One example of smoothing and equalization for unvoiced speech calculates a polynomial fit to amplitudes of residual signal in logarithmic domain. As an example, a second order polynomial and in log 10 domain can be used. After converting the polynomial fit from logarithmic domain back to linear domain, the fitting curve is advantageously normalized to 1.0 at the point that corresponds to the starting point for the backward-forward procedure. Subsequently, the fitting curve is lower-limited, e.g., to 0.5, where after the amplitudes of the residual signal can be divided with the fitting curve such as to smoothly equalize out the variations in amplitude of the unvoiced residual signal.

Concerning weighted overlap-add procedures, some but not all applications of which are disclosed earlier in this description, i.e., the indexing and interpolation operation 620 and the method to initiate the input signal for the phase adjustment filtering 970, procedures may be performed as known by a person skilled in the art. However, in preferred embodiments of weighted overlap-add procedures, the methods disclosed in the following may advantageously used.

In a simple embodiment of a weighted overlap-add procedure modified in response to a matching quality indicator, we consider a first window multiplied with a first subsequence and a second window multiplied with a second subsequence, and these two products enter into an overlap-add operation. Now, as an example, we let the first window be a taper-down window, such as a monotonically decreasing function, and we let the second window be a taper-up window, such as a monotonically increasing function. Secondly, for the purpose of a simple example, we let the second window be parameterized by a basic window shape times a scalar multiplier. We now define: target as said first subsequence; w_target as said first subsequence sample-by-sample multiplied with said taper-down window; w_regressor as said second subsequence sample-by-sample multiplied with said basic window shape for the taper-up window; and coef as said scalar multiplier. Now the scalar multiplier component of the second window can be optimized such as to minimize a summed squared error between target and the result of the overlap-add operation. Using for convenience a matrix-vector notation, the problem can be formulated as minimizing the summed-squared difference between target and the quantity $$w\_target + w\_regressor * coef$$

Defining from here vectors T and H as $$T = target - w\_target$$

$$H = w\_regressor$$

The solution to this optimization is given as $$coef = inv(trans(H) * H) * trans(H) * T$$

In which inv( ) denotes scalar or matrix inversion, trans( ) denotes the transpose of a matrix or vector and * is matrix or vector multiplication. Now, as central components in the inventions disclosed herewith, this method can be expanded to optimize the actual shape of a window. One way to obtain this is as follows. We define a set of shapes for which the wanted window is obtained as a linear combination of elements in this set. We now define H such that each column of H is a shape from this set sample by sample multiplied with said second subsequence, and we define coef as a column vector containing the unknown weights of these shapes in the optimized window function. With these definitions, the above equations formulating the problem and its solution, now applies to solving for a more general window shape. Naturally, the role of the first and the second window can be interchanged in the above, such that it is now the first window for which optimization takes place.

A more advanced embodiment of the present invention jointly optimizes both window shapes. This is made by defining a second set of basic window shapes, possibly equivalent with the first set of window shapes, and advantageously selected as a time reversed indexing of the samples in each of the window shapes in the first set of window shapes. Now define the w_target as a matrix in which each column is a basic window shape from said second set of window shapes sample by sample multiplied with the first subsequence and define coef as a column vector containing first the weights for the first window and second the weights for the second window. Then the more general problem can be formulated as minimizing the summed-squared difference between the target and the quantity $$[w\_target\ w\_regressor] * coef$$

where square brackets [ ] are used to form a matrix from sub-matrices or vectors. Now, defining from here vectors T and H as $$T = target$$

$$H = [w\_target\ w\_regressor]$$

The solution to this optimization is given as $$coef = inv(trans(H) * H) * trans(H) * T$$

Further, a more advanced embodiment of the present invention optimizes not only instantaneous window shapes but windows with an optimized frequency dependent weighting. One embodiment of this invention applies the form of a tapped delay line, though the general invention is by no means limited to this form. One way to accomplish this generalization is to replace, in the definition of w_target and w_regressor above, each column with a number of columns each sample by sample multiplying with the basic window shape corresponding to the column they replace but where this basic window shape is now sample by sample multiplied with the relevant subsequence delayed corresponding to a specific position in a tapped delay line.

Advantageously, optimizations of coefficients in these methods take into account a weighting, constraint, or sequential calculation of the coefficients without deferring from the invention disclosed herewith. Such weightings may advantageously include weighting towards more weight on coefficients corresponding to low absolute delay values. Such sequential calculation may advantageously calculate coefficients for low absolute delay values first, such as to minimize the sum of squared error using those coefficients only, and then subsequently repeating this process for increasing delay values but only on the remaining error from the earlier steps in this process.

In general, embodiments of this invention take several subsequences as targets of the optimization. The optimization in general terms minimize a distortion function, which is a function of these target subsequences and the output from the weighted overlap-add system. This optimization may without diverging from the present invention, apply various constraints on the selection of basic shapes and delays and their weighting in the overall overlap-add. Depending on the exact selection of shapes, the effect of the overlap-add is advantageously faded out gradually from subsequences following the overlap-add region in time.

Figure 10:
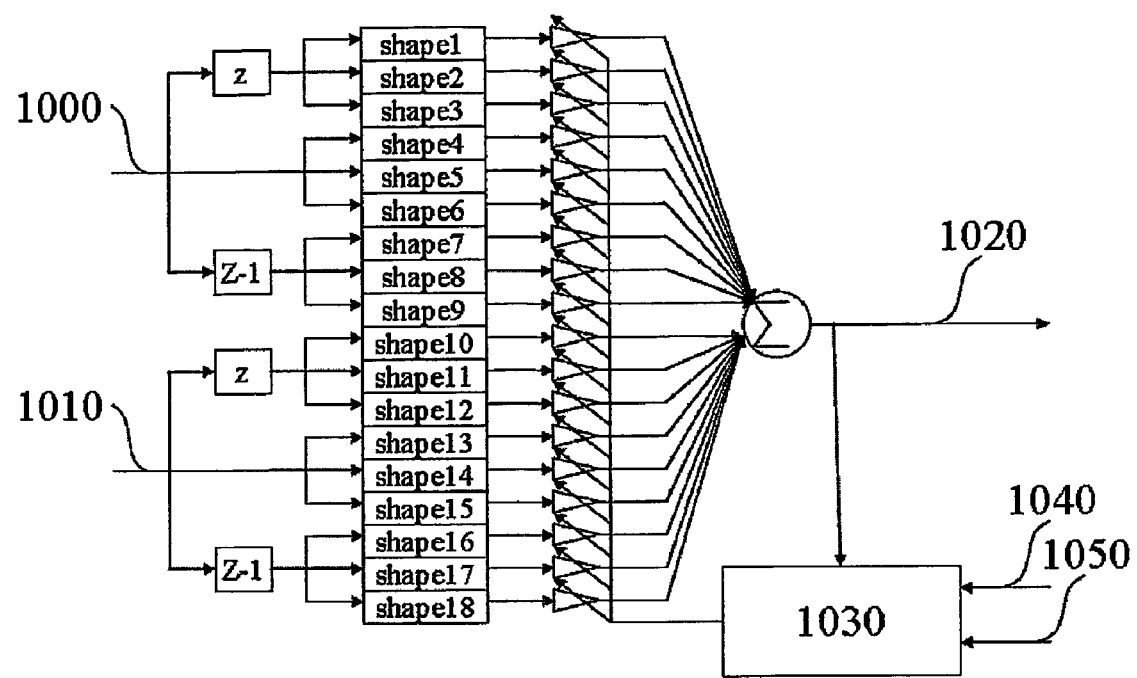
FIG. 10 illustrates one embodiment of the disclosed weighted overlap-add procedure.

FIG. 10 illustrates one embodiment of the disclosed overlap-add method. This figure is only for the purpose of illustrating one embodiment of this invention, as the invention is not limited to the exact structure in this figure. In FIG. 10, one subsequence 1000 enters the time and frequency shape optimized overlap-add with another subsequence 1010. Each of these subsequences enters a separate delay line, where in the figure, z designates a time advance of one sample and z−1 designates a time delay of one sample, and where the selected delays of 1, −1, and 0 are purely for the purpose of illustration: other, more and less, delays can advantageously be used in connection with the present invention. Each delayed version of each subsequence is now multiplied with a number of base window shapes, and the result of each of these are multiplied with a coefficient to be found jointly with the other coefficients in the course of the optimization. After multiplication with these coefficients the resulting subsequences are summed to yield the output 1020 from the time and frequency shape optimized overlap-add. The optimization 1030 of coefficients takes, in the example of FIG. 10, subsequences 1040 and 1050 as input, and minimize a distortion function, which is a function of 1040 and 1050 and the output 1020.

In the claims reference signs to the figures are included for clarity reasons only. These references to exemplary embodi-

The invention claimed is:

1. A method for generating a sequence of concealment samples in connection with transmission of a digitized audio signal, the method comprising:
generating the sequence of concealment samples from buffered samples, stored in a storage device, of the digitized representation of audio signal in sample time order, wherein the sequence of concealment samples includes at least a first and a second set of two consecutive subsequences of concealment samples,
wherein the first and second sets of two consecutive subsequences of concealment samples are based on respective first and second sets of two subsequences of buffered samples, wherein the two subsequences of buffered samples in the respective first and second sets of two subsequences of buffered samples are ordered in reverse sample order,
wherein said second set of two consecutive subsequences of concealment samples is located later in the sequence of concealment samples than the first set of two consecutive subsequences of concealment samples, and
wherein a first subsequence of the first set of two consecutive subsequences of concealment samples is based on a first subsequence of buffered samples, and a first subsequence of the second set of two consecutive subsequences of concealment samples is based on a second subsequence of buffered samples, wherein the second subsequence of buffered samples is located further back in sample time than the first subsequence of buffered samples.

2. The method according to claim 1, wherein two subsequences of buffered samples in the respective first and second sets of two subsequences of buffered samples are consecutive in reverse time order.

3. The method according to claim 1, wherein a location of said subsequences of buffered samples being located at a point that evolves gradually backwards and forwards in sample time during the generation of the sequence of concealment samples.

4. The method according to claim 2, wherein at least three consecutive subsequences in the sequence of concealment samples are based on at least three consecutive subsequences of the buffered samples in reverse sample time order.

5. The method according to claim 1, wherein said subsequences of buffered samples are reordered in sample time based on a sequential process of indexing and reading a plurality of buffered samples in an increasing time order and stepping a number of buffered samples in a reverse time order.

6. The method according to claim 5, wherein said sequential process of indexing and reading buffered samples includes
indexing a buffered sample by stepping a number of buffered samples in a reverse time order, and
reading a plurality of buffered samples in an increasing time order, starting with the indexed buffered sample, and using the read samples for calculation of a sequence of the sequence of concealment samples,
wherein the plurality of buffered samples read in the increasing time ordered is different from the plurality of buffered samples stepped in the reverse time order.

7. The method according to claim 6, wherein the plurality of buffered samples read in the increasing time order is larger than the plurality of buffered samples stepped in the reverse time order.

8. The method according to claim 6, wherein the plurality of buffered samples read in the increasing time order is smaller than the plurality of buffered samples stepped in the reverse time order.

9. The method according to claim 1, wherein said subsequences of the sequence of concealment samples are calculated from subsequences of the buffered samples by involving a weighted overlap-add procedure.

10. The method according to claim 9, wherein the weighting functions in said weighted overlap-add procedure is a function of frequency.

11. The method according to claim 9, wherein said weighted overlap-add procedure is modified in response to a matching quality indicator.

12. The method according to claim 11, wherein the matching quality indicator is responsive to at least two subsequences of samples that enter into the weighted overlap-add procedure.

13. The method according to claim 5, wherein at least a portion of said reordering in sample time is described by a backwards and a forwards evolution of a location pointer.

14. The method according to claim 13, wherein said backwards evolution of said location pointer is limited by the use of a stopping criteria.

15. The method according to claim 1, wherein a smoothing and equalization operation is applied to said buffered samples.

16. The method according to claim 14, wherein said stopping criteria for said backwards evolution, a pace of said forwards and said backwards evolution, and a plurality of initiated said backwards evolutions are jointly optimized to optimize the sound quality when interpreted by a human listener by applying at least one of an iterative optimization method, a Markov decision process and a Viterbi method.

17. The method according to claim 14, wherein said stopping criteria for the backwards evolution, a pace of said forwards evolution and said backwards evolution, by number of initiated said backwards evolutions, and said smoothing and equalization operation are jointly optimized to optimize the sound quality when interpreted by a human listener, by applying at least one of an iterative optimization method, a Markov decision process and a Viterbi method.

18. The method according to claim 14, wherein said backwards and forwards evolutions of the location pointer are jointly optimized to optimize the sound quality when interpreted by a human listener, by applying at least one of an iterative optimization method, a Markov decision process and a Viterbi method.

19. The method according to claim 1, wherein a phase filtering is applied to minimize discontinuities at boundaries between the sequence of concealment samples and a consecutive frame of samples.

20. The method according to claim 16, wherein a phase filtering is applied to minimize discontinuities at boundaries between the sequence of concealment samples and a consecutive frame of samples, and wherein said joint optimization also includes signal distortion introduced by the phase filtering to optimize the sound quality when perceived by a human listener.

21. The method according to claim 1, wherein a noise mixing is introduced in the sequence of concealment samples.

22. The method according to claim 5, wherein a noise mixing is introduced in the sequence of concealment samples, and wherein said noise mixing is modified in response to the sequential process of indexing a plurality of buffered samples in the increasing time order and stepping a plurality of buffered samples in the reverse time order.

23. The method according to claim 22, wherein said sequential process of indexing a plurality of buffered samples in the increasing time order and stepping the plurality of buffered samples in the reverse time order and said response to it includes the use of a matching quality indication.

24. The method according to claim 1, wherein an attenuation function is applied in the sequence of concealment samples.

25. The method according to claim 5, wherein an attenuation function is applied in the sequence of concealment samples, and wherein said attenuation function is modified in response to the sequential process of indexing a plurality of buffered samples in the increasing time order and stepping the plurality of buffered samples in the reverse time order.

26. The method according to claim 25, wherein the sequential process of indexing the plurality of buffered samples in increasing time order and stepping the plurality of buffered samples in the reverse time order and said response to it includes the use of a matching quality indication.

27. The method according to claim 1, wherein a resulting number of samples in the sequence of concealment samples is preset.

28. The method according to claim 27, wherein said preset number of samples is independent of characteristics of the digitized audio signal.

29. The method according to claim 27, wherein said preset number of samples has a preset integer value in a range of about 5 to about 1000.

30. The method according to claim 1, wherein the sequence of concealment samples are included in a first concealment frame.

31. The method according to claim 30, wherein the method further comprises generating at least a second concealment frame consecutive to the first concealment frame, the second frame including a second sequence of concealment samples.

32. The method according to claim 31, wherein sequences of concealment samples in the first and second concealment frames are different.

33. The method according to claim 31, wherein the first and second concealment frames include a same number of samples.

34. The method according to claim 33, wherein at least one subsequences of samples in the second concealment frame is at least partly based on subsequences of buffered samples further back in sample time than any of the subsequences of samples included in the first concealment frame.

35. A computer program product comprising a non-transitory computer readable recording medium having computer readable program codes embodied in the medium that, when executed on a computer, cause the computer to carry out the method as claimed in claim 1.

36. An arrangement for receiving a digitized audio signal, the arrangement including:
 a storage device configured to store samples representative of a received digitized audio signal, and
 a processor configured to perform the method as claimed in claim 1.

37. The method according to claim 29, wherein said preset number of samples has a preset integer value in the range of about 20 to about 500.

* * * * *

UNITED STATES PATENT AND TRADEMARK OFFICE
CERTIFICATE OF CORRECTION

| | | |
|---|---|---|
| PATENT NO. | : 8,068,926 B2 | Page 1 of 1 |
| APPLICATION NO. | : 11/883427 | |
| DATED | : November 29, 2011 | |
| INVENTOR(S) | : Soren Andersen | |

It is certified that error appears in the above-identified patent and that said Letters Patent is hereby corrected as shown below:

In Claim 1, column 25, line 19, please delete "sample order" and insert --sample time order--.

In Claim 6, column 25, line 62, please delete "ordered" and insert --order--.

Signed and Sealed this
Seventeenth Day of April, 2012

David J. Kappos
*Director of the United States Patent and Trademark Office*